United States Patent
Kawana

(10) Patent No.: US 7,532,410 B2
(45) Date of Patent: May 12, 2009

(54) PROJECTING ZOOM LENS AND PROJECTION TYPE DISPLAY DEVICE

(75) Inventor: Masanao Kawana, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/142,700

(22) Filed: Jun. 19, 2008

(65) Prior Publication Data

US 2008/0316616 A1    Dec. 25, 2008

(30) Foreign Application Priority Data

Jun. 22, 2007    (JP)    ............... P2007-165191

(51) Int. Cl.
*G02B 15/14*    (2006.01)
(52) U.S. Cl. ...................... 359/683; 359/676
(58) Field of Classification Search ......... 359/680–682, 359/676, 683
See application file for complete search history.

(56) References Cited

U.S. PATENT DOCUMENTS 6,633,436 B2 * 10/2003 Wada et al. .................. 359/681
6,639,737 B2 * 10/2003 Yasui et al. .................. 359/761

2006/0139766 A1   6/2006  Sawamoto

FOREIGN PATENT DOCUMENTS

| JP | 2004-138812 A | 5/2004 |
| JP | 2006-162734 A | 6/2006 |
| JP | 2006-184723 A | 7/2006 |
| JP | 2006-317976 A | 11/2006 |

* cited by examiner

*Primary Examiner*—Scott J Sugarman
(74) *Attorney, Agent, or Firm*—Birch, Stewart, Kolasch & Birch, LLP

(57) ABSTRACT

A projecting zoom lens includes in order from a magnification side, a first negative group, second, third and fourth positive groups, a fifth negative group and a sixth positive group. The third group, the fourth group and the fifth group are moved along the optical axis to the magnification side during zooming from the wide-angle end to the telephoto end, and such that the projecting zoom lens satisfies given following conditional expressions:

$$0.9 < |f1|/fw < 1.7 \quad (1)$$

$$55 < vd4 \quad (2).$$

6 Claims, 13 Drawing Sheets

EMBODIMENT 1

FIG. 7
EMBODIMENT 1
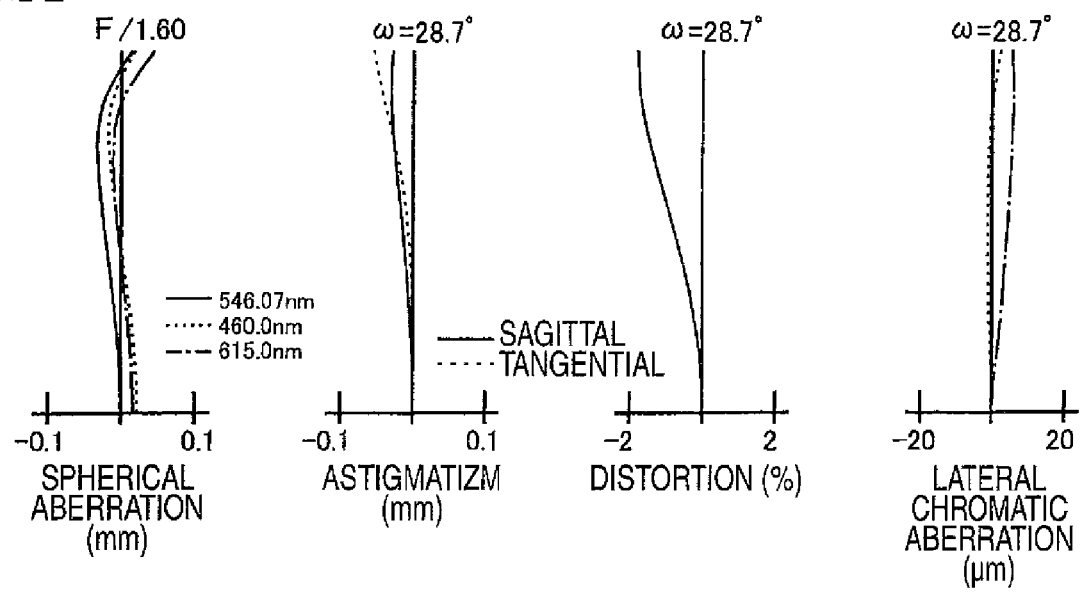
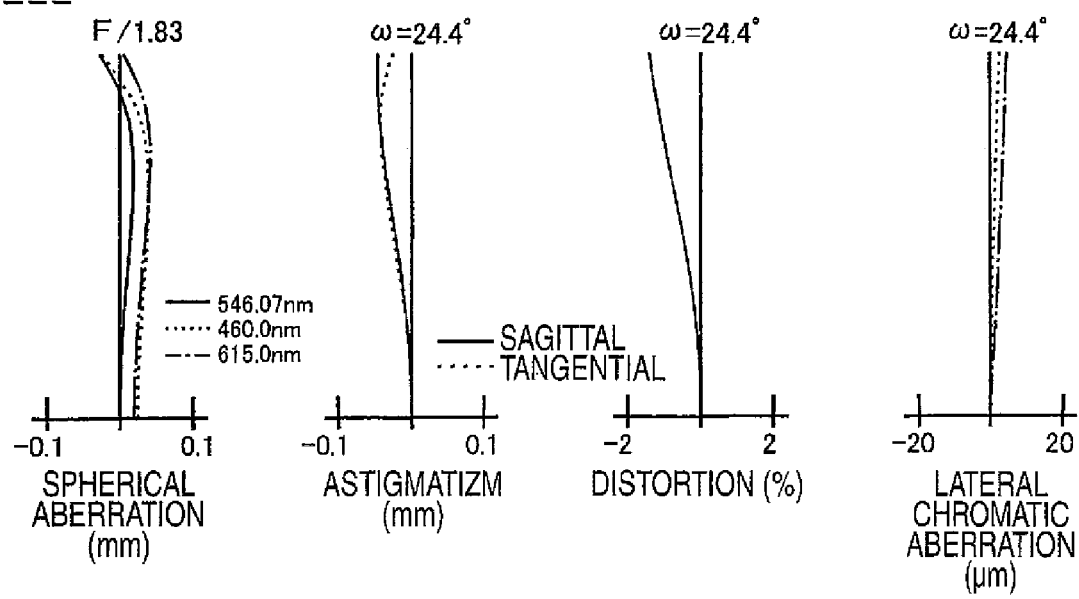

FIG. 8
EMBODIMENT 2
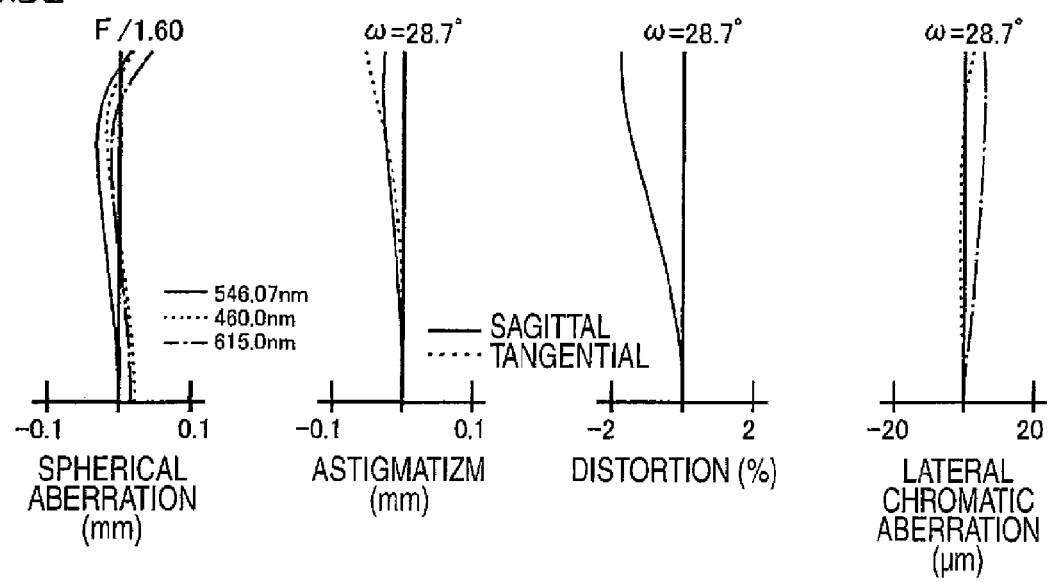
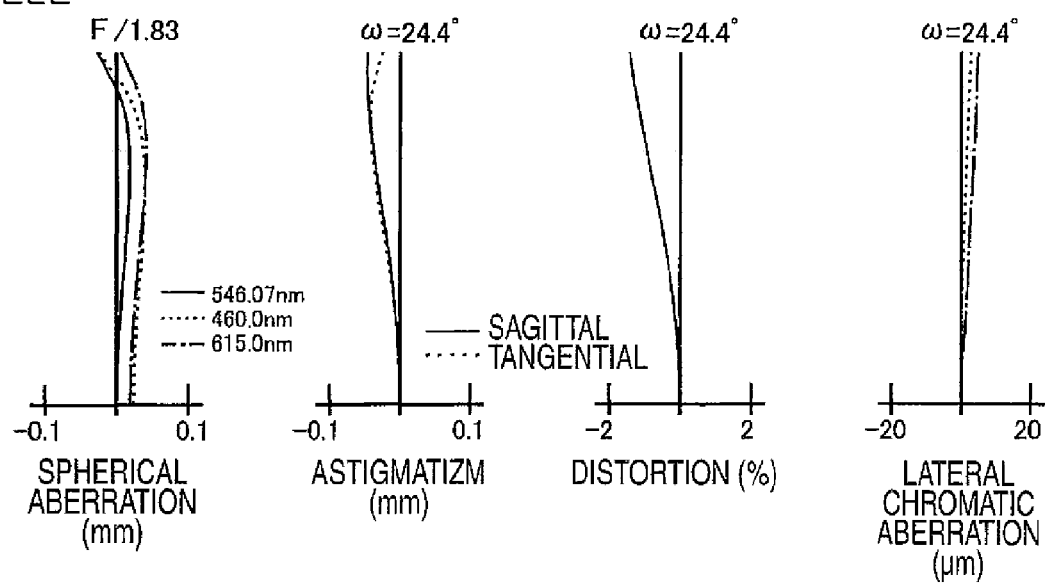

FIG. 9
EMBODIMENT 3
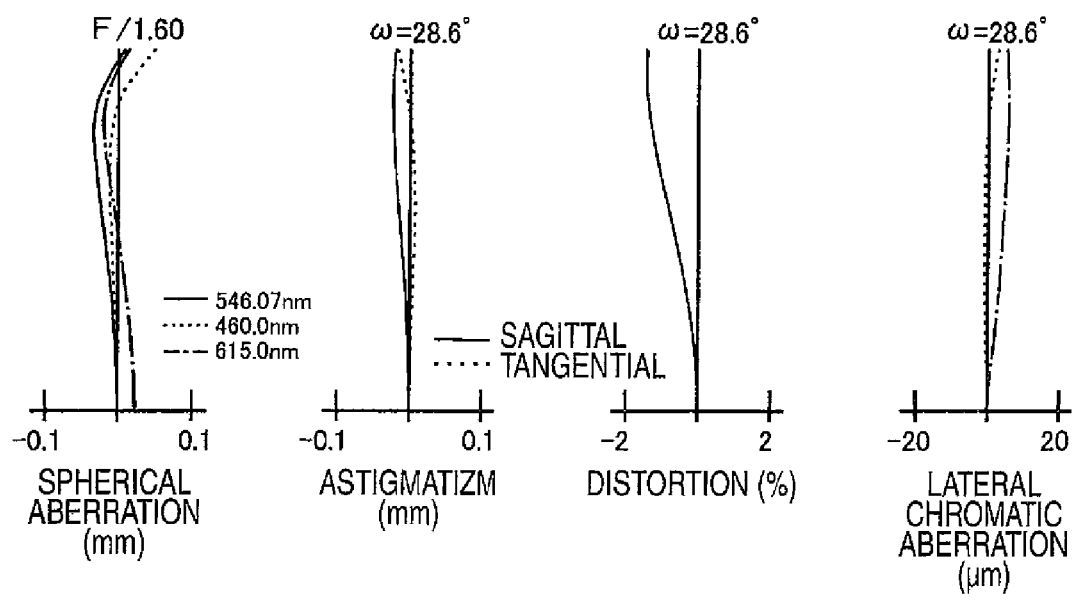
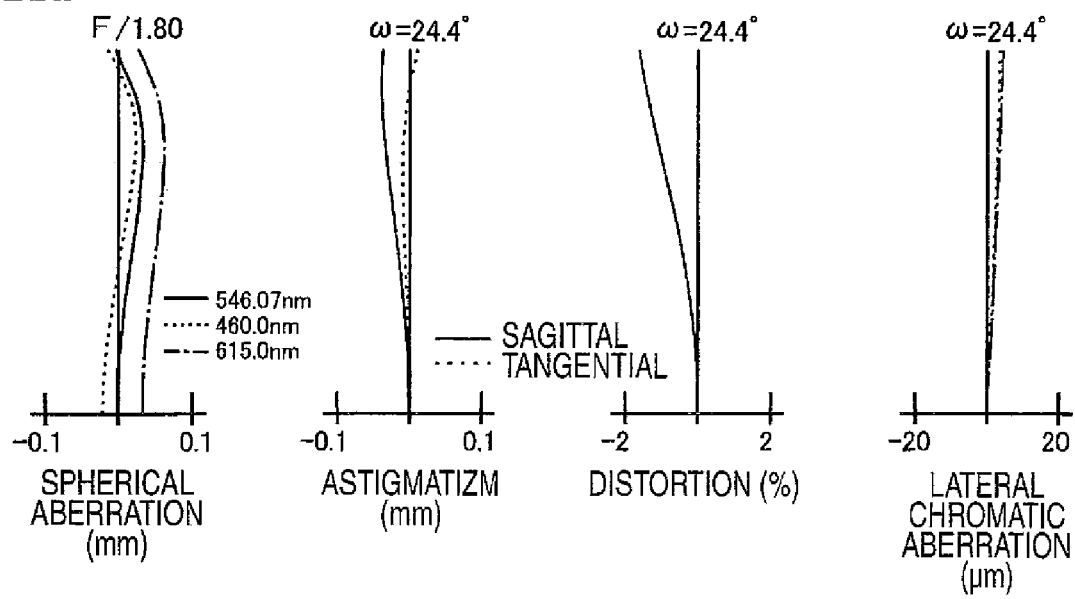

FIG. 10
EMBODIMENT 4
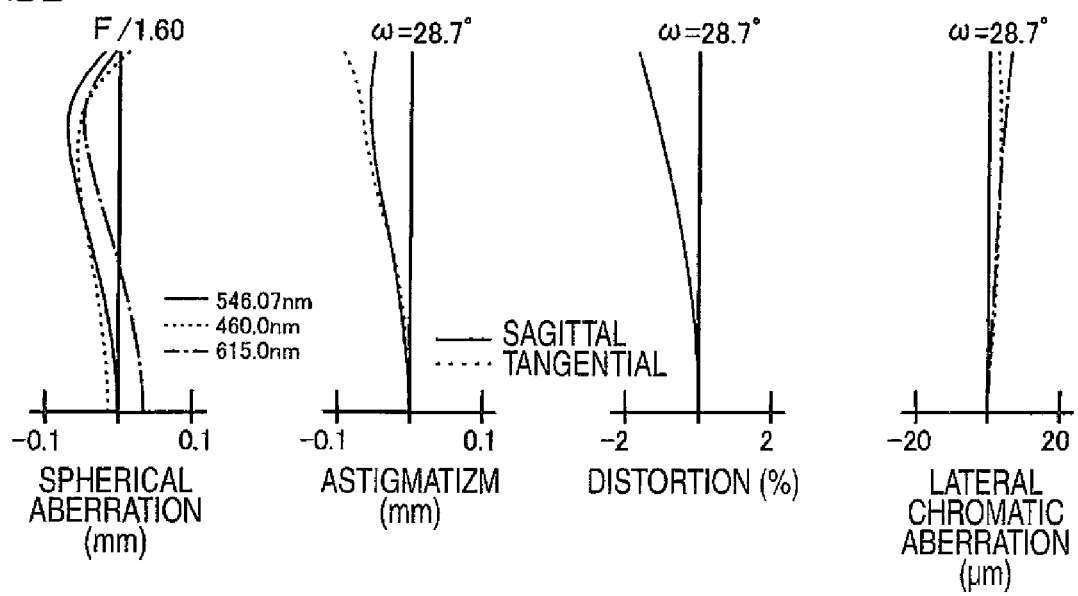
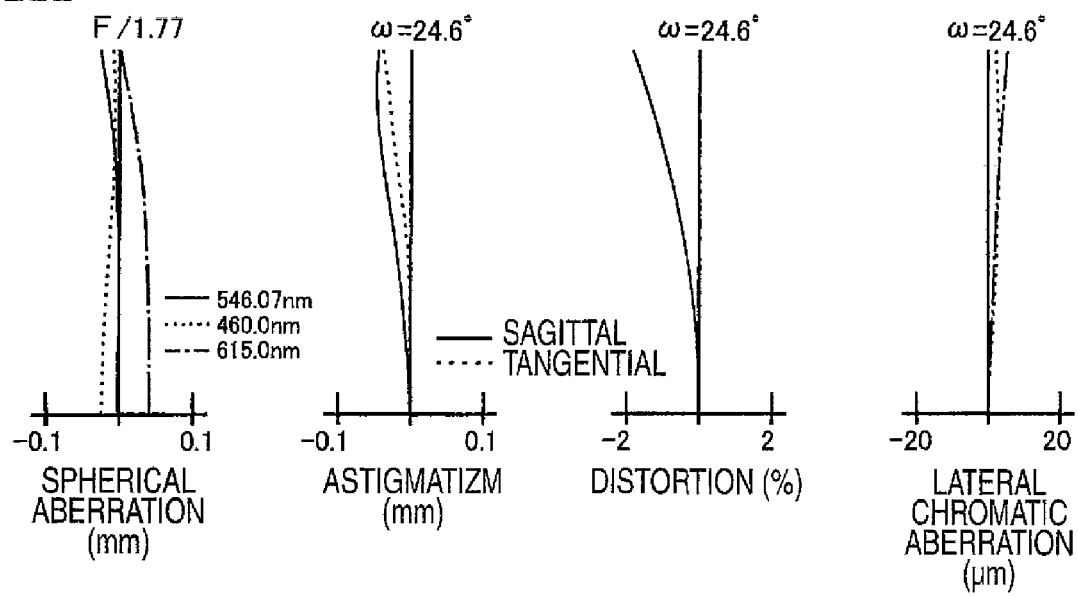

FIG. 11
EMBODIMENT 5
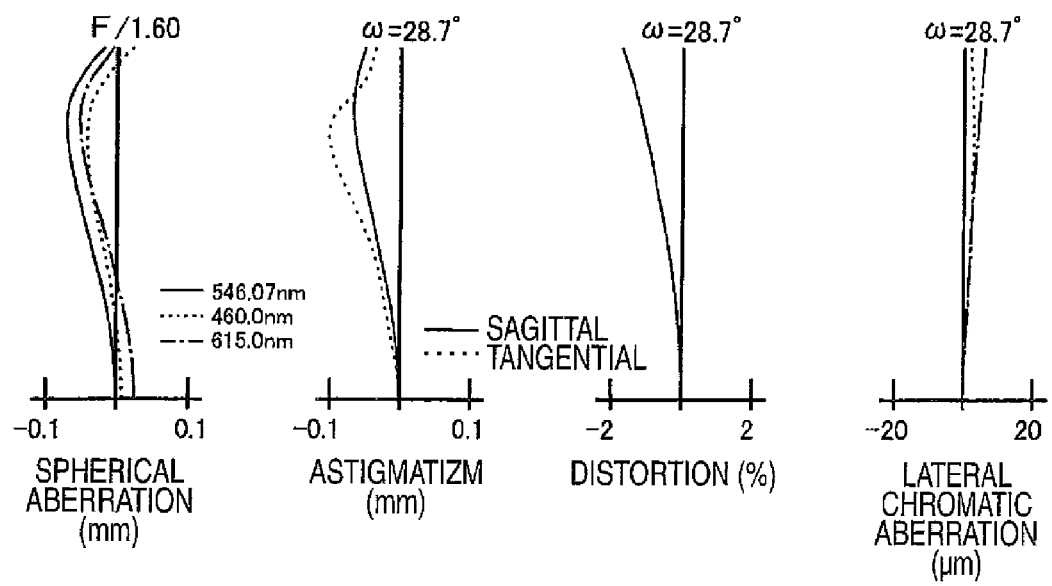
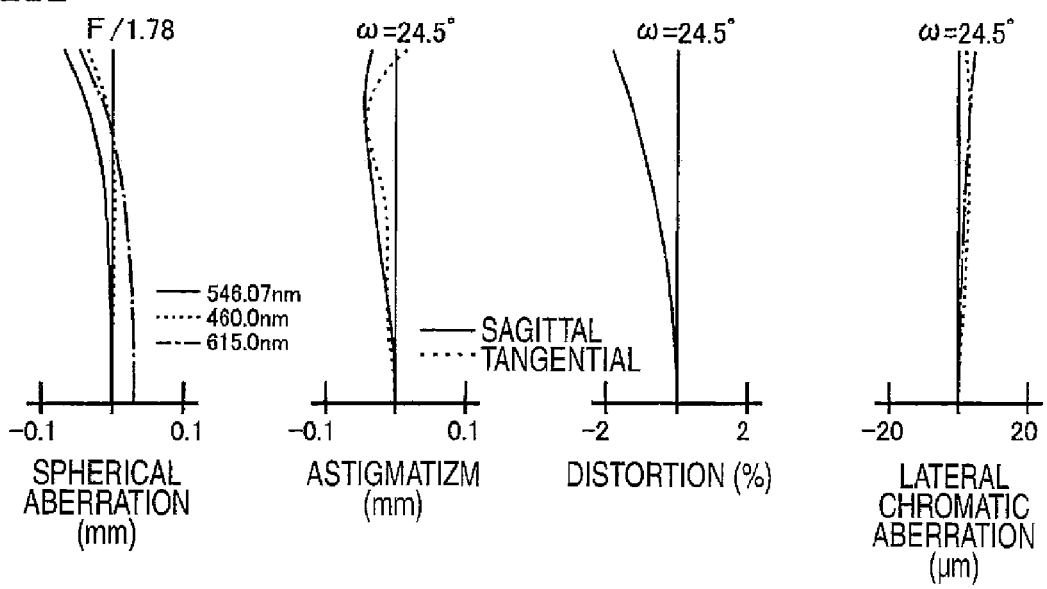

FIG. 12
EMBODIMENT 6
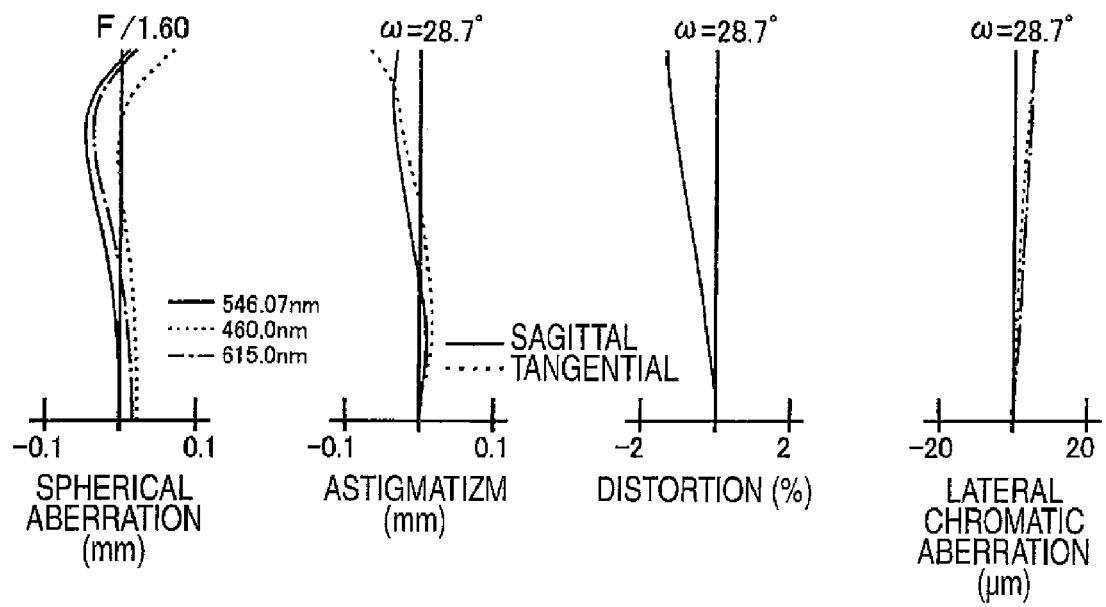
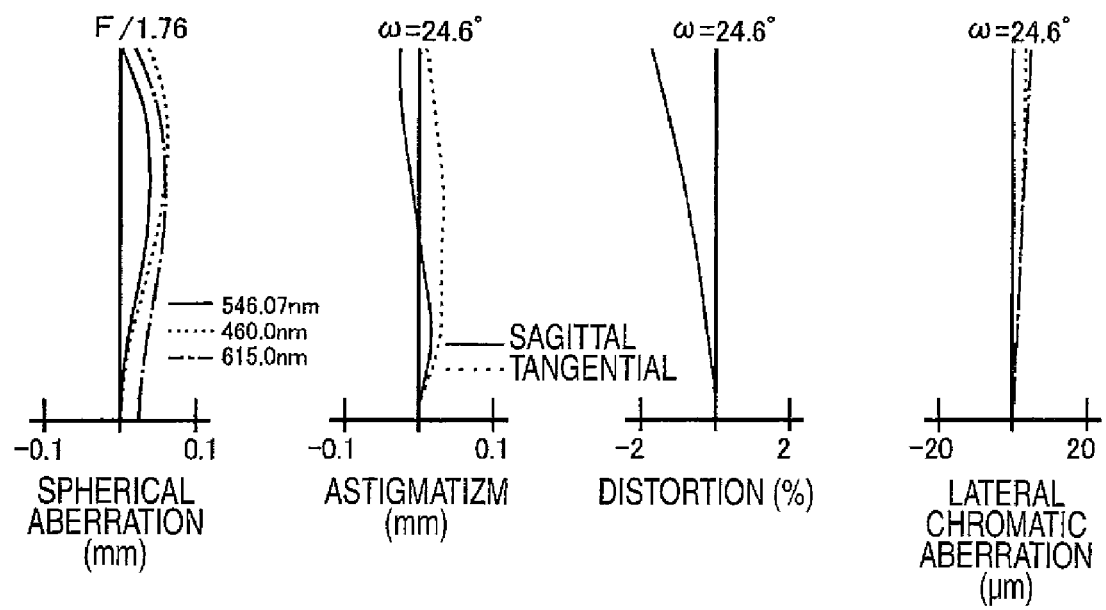

PROJECTING ZOOM LENS AND PROJECTION TYPE DISPLAY DEVICE

CROSS-REFERENCE TO RELATED APPLICATIONS

This application is based on and claims priority under 35 USC 119 from Japanese Patent Application No. 2007-165191 filed Jun. 22, 2007.

BACKGROUND

1. Technical Field

The present invention relates to a projecting zoom lens having six groups and mounted on a projection type display device or the like and to a projection type display device having the projecting zoom lens mounted thereon and, more particularly, to a projecting zoom lens and a projection type display device for magnifying and projecting such a luminous flux on a screen carrying video information from a light valve of a liquid crystal display device or a DMD (Digital Micromirror Device) display device.

2. Related Art

In recent years, there becomes widespread the projection type display device using the light valve such as the liquid crystal display device or the DMD display device. This widely used device is constituted such that three light valves are used to correspond respectively to the illuminating lights of the three primaries RGB thereby to modulate those illuminating lights, and such that the lights modulated by the respective light valves are synthesized by a prism or the like and are displayed through a projection lens on a screen.

In the light valves described above, the size reduction and the high precision advance abruptly, and the personal computers become widespread. As a result, the demands for presentations using that projection type display device are rising. Thus, the projection type display device is demanded to have a higher performance, a smaller size and a lighter weight.

In the projection type display device, in which the respective modulated lights from the three light valves are synthesized and projected by a color synthesizing optical system, the projecting lenses requires long back focuses to arrange prisms for the color synthesization. In the color synthesizing optical system, moreover, the spectroscopic characteristics are changed by the angles of incident lights, so that the projecting lenses requires the characteristics, in which the incident pupils seen from the reduction side are sufficiently distant, that is, the telecentricity. There are further needed bright lenses and aberration corrections matching the resolution of the device. In the case of the front type, the zooming function and the wide-angle of view are also demanded from the viewpoint of mountability. In accordance with the size reduction of the light valve itself, the increased demand for the mobile application and the reduced price of the projector, moreover, there is a tendency to demand the smaller size and lighter weight form the projection lens.

As the projection lens capable of satisfying those demands, there are known a number of zooming types (as referred to Patent Documents 1 (JP-A-2004-138812)and 2 (JP-2006-162734), for example), in which the lenses are composed of, in order from the magnification side, five groups of negative—positive—positive—positive (or negative)—positive such that the second, third and fourth lens groups are moved during zooming along the optical axis, and the first lens group and the fifth lens group are fixed.

In the following Patent Documents 3 (JP-A-2006-184723) and 4 (JP-A-2006-317976), for example, there are another zooming type, in which the lenses are composed of, in order from the magnification side, six groups of negative—positive—positive—positive (or negative)—positive and the first lens group and the sixth lens group are fixed.

It is known that the performance of a lens may be improved if the degree of freedom for optical designs may be raised by increasing the number of lens or the zoom moving groups. However, the increase in the number of lens portions leads directly to the upsizing of the device or the rise of the cost, and the spectral transmittance is lowered if the thickness of the glass material of the entire lens system increases. The drop of the spectral transmittance is serious especially on the shorter wave side, and is disadvantageous especially in the projecting optical system, for which it is difficult to adjust directly the projected image having passed through the projection lens.

The present invention has been conceived in view of the background thus far described, and has an object to provide an inexpensive projecting zoom lens, which can hold the telecentricity on a reduction side while achieving a wide-angle of view, which can correct satisfactorily various aberrations such as spherical aberrations, longitudinal chromatic aberrations and field curvatures, and which can achieve the size reduction even with high brightness and performance, and a projection type display device.

BRIEF DESCRIPTION OF THE DRAWINGS

FIG. 7 shows aberration diagrams showing several aberrations (i.e., spherical aberrations, astigmatisms, distortions, and lateral chromatic aberrations) of the projecting zoom lens of Embodiment 1.

FIG. 8 shows aberration diagrams showing several aberrations (i.e., spherical aberrations, astigmatisms, distortions, and lateral chromatic aberrations) of the projecting zoom lens of Embodiment 2.

FIG. 9 shows Aberration diagrams showing several aberrations (i.e., spherical aberrations, astigmatisms, distortions, and lateral chromatic aberrations) of the projecting zoom lens of Embodiment 3.

FIG. 10 shows Aberration diagrams showing several aberrations (i.e., spherical aberrations, astigmatisms, distortions, and lateral chromatic aberrations) of the projecting zoom lens of Embodiment 4.

FIG. 11 shows Aberration diagrams showing several aberrations (i.e., spherical aberrations, astigmatisms, distortions, and lateral chromatic aberrations) of the projecting zoom lens of Embodiment 5.

FIG. 12 shows Aberration diagrams showing several aberrations (i.e., spherical aberrations, astigmatisms, distortions, and lateral chromatic aberrations) of the projecting zoom lens of Embodiment 6.

SUMMARY

Figure 1:
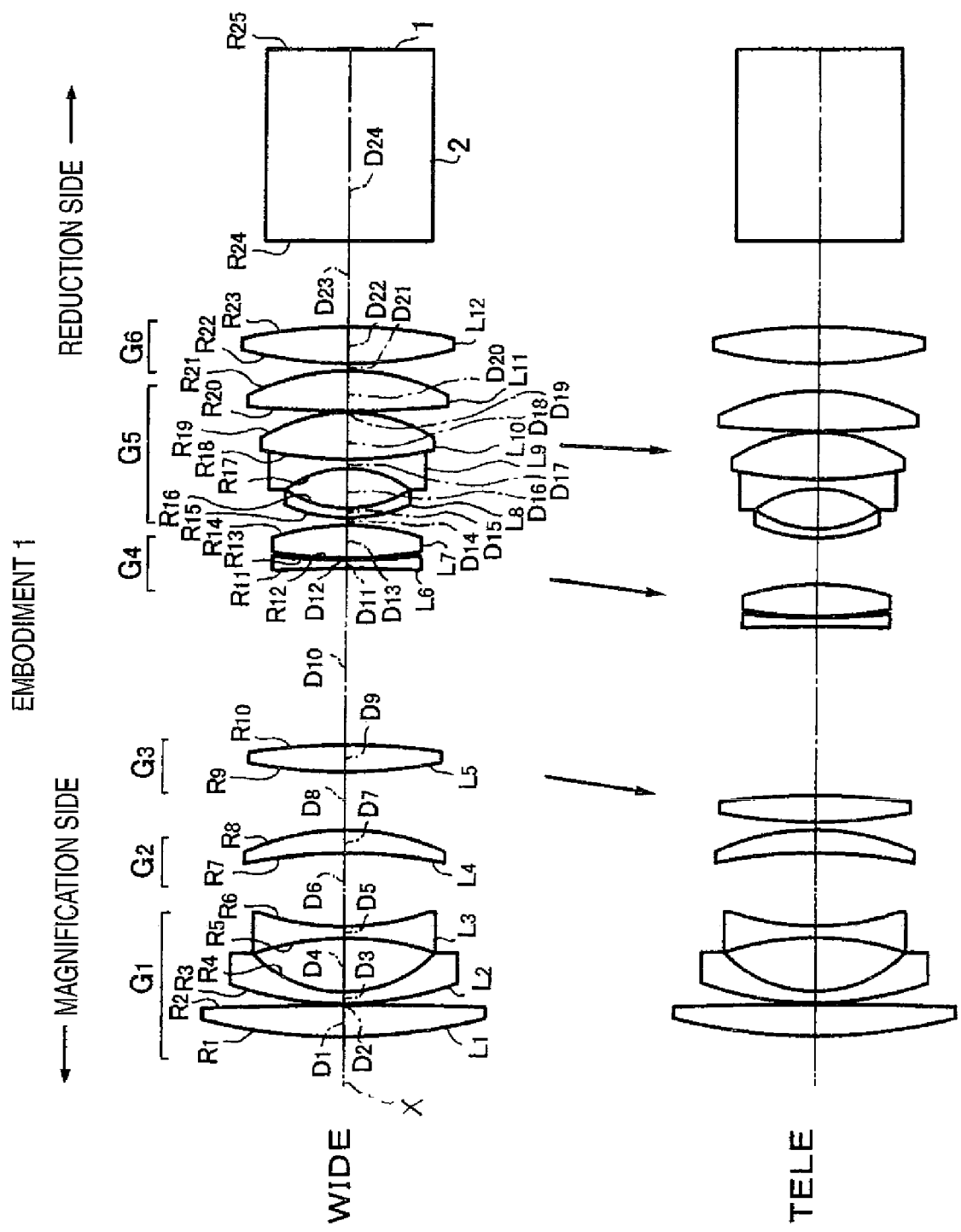
FIG. 1 shows a schematic view showing a constitution of a projecting zoom lens according to Embodiment 1 of the invention.

[1] According to an aspect of the invention, a projecting zoom lens includes in order from magnification side, a first lens group having a negative refractive power, a second lens group having a positive refractive power, a third lens group having a positive refractive power, a fourth lens group having a positive refractive power, a fifth lens group having a positive or negative refractive power and a sixth lens group having a positive refractive power. The third to fifth lens groups are moved along an optical axis toward the magnification side during zooming from a wide-angle end state to a telephoto end state. And following Conditional Expressions (1) to (2) are satisfied:

$$0.9 < |f1|/fw < 1.7 \quad (1)$$

$$55 < vd4 \quad (2)$$

where f1 denotes a focal length of the first lens group, fw denotes a focal length of the projecting zoom lens at the wide angle end state and vd4 denotes an Abbe number of glass material of which a positive lens contained in the fourth lens group is made.

[2] According to the projecting zoom lens of [1], the first lens group and the sixth lens group may be fixed during zooming.

[3] According to the projecting zoom lens of [1] or [2], the first lens group may be moved along the optical axis during focusing.

[4] According to the projecting zoom lens of [1], [2] or [3], the second lens group may include a positive lens having a convex face directed toward a reduction side. The third lens group may include a positive lens having a convex face directed toward a magnification side.

[5] According to the projecting zoom lens of [1], [2], [3] or [4], the following Conditional Expression (3) may satisfied:

$$1.7 < Nav \quad (3)$$

where Nav denotes mean value of refractive indices at d-line of (i) glass material of which a positive lens contained in the second lens group is made and (ii) glass material of which a positive lens contained of third lens group is made.

According to a projecting zoom lens of [1], [2], [3], [4] or [5], a projection type display device includes a light source, a light valve, an illuminating optical unit that guides the luminous flux from the light source to the light valve, a projecting zoom lens of [1], [2], [3], [4] or [5]. The light valve modulates the luminous flux from the light source. The projection type display device projects the modulated luminous flux on a screen.

According to the projecting zoom lens of the invention, the projecting zoom lens includes six groups, among which the power, the zooming function and the aberration correcting function are properly distributed, so that zooming ratio of about 1.2, F number of 1.6 in the wide-angle end state are achieved while balancing the aberrations, thereby to provide an inexpensive wide-angle zoom lens which is small in size and excellent in mass production.

Moreover, the conditional expression (1) is defined to set the power distribution to the first lens group properly in the wide-angle end state. If the ratio is lower than the lower limit of the conditional expression (1), the power of the first lens group is excessively strong and thereby make it difficult to correct the aberrations produced by each lens group. If the ratio is higher than the upper limit, on the other hand, the power of the first lens group becomes so relatively low that the enlargement of the optical system is invited if the focal length of the entire system is kept within a given range.

By satisfying the conditional expression (1), therefore, the optical system may be made compact while making the correction of the aberration satisfactory.

Next, the conditional expression (2) is defined to correct a longitudinal chromatic aberration. If the Abbe number falls short of the lower limit of the conditional expression (2), the longitudinal chromatic aberration increases to cause bleeding.

By satisfying the conditional expression (2), therefore, the longitudinal chromatic aberration may be reduced to suppress the bleeding.

Moreover, the conditional expression (3) is one for correcting the image curvature, If the refractive index falls short of the lower limit of the conditional expression (3), the Petzval sum increases to become a factor to deteriorate the focusing in a region apart from the optical axis.

By satisfying the conditional expression (3), therefore, the image curvature may be excellently corrected.

DETAILED DESCRIPTION

Specific modes of embodiments of the invention are described in the following with reference to the accompanying drawings. A projecting zoom lens of a mode of embodiment (showing the wide-angle end state of Embodiment 1 representatively), as shown in FIG. 1, includes in order from a magnification side, a first lens group G1 having a negative refractive power, second to fourth lens groups G2 to G4 respectively having positive refractive powers, a fifth lens group G5 having a negative refractive power and a sixth lens group G6 having a positive refractive power. In rear of the projecting zoom lens, there are arranged a glass block (containing a filter portion) 2 constituted mainly of a color synthesizing prism, and an image display face 1 of a light valve such as a liquid crystal display panel. Incidentally, letter X denotes an optical axis.

Here, the first lens group G1 includes, in order from the magnification side, a first lens L1 made of a positive lens, a second lens L2 made of a negative meniscus lens having a convex face directed to the magnification side, and a third lens L3 made of a biconcave lens. The second lens group G2 includes a fourth lens L4 made of a positive lens having a convex face directed to the reduction side. The third lens group G3 includes a fifth lens L5 made of a positive lens having a convex face directed to the reduction side. The fourth lens group G4 includes a sixth lens L6 made of a biconcave lens and a seventh lens L7 made of a biconvex lens. The fifth lens group G5 includes in order from the magnification side, an eighth lens L8 made of a lens of a low power having a convex face directed to the magnification side, a cemented lens by cementing a ninth lens L9 made of a biconcave lens and a tenth lens L10 made of a biconvex lens, and an eleventh lens L11 made of a positive lens. The sixth lens group G6 includes a twelfth lens L12 made of a positive lens.

Here, the lens constitutions of the aforementioned respective lens groups should not be limited to the aforementioned ones, but may be modified by increasing or decreasing one or more negative lens or positive lens.

Moreover, the fifth lens group G5 may also be constituted to have a positive refractive power.

The projecting zoom lens of the present mode of embodiment is a negative lead type zoom lens, as has been described hereinbefore, so that it is possible to make a wide-angle and to retain the back focus with a proper length.

Moreover, the projecting zoom lens of this mode of embodiment is constituted to have a zooming function by moving the three lens groups of third lens group G3 to the fifth lens group G5. Specifically, the whole lens system is divided into six groups and the zooming function is divided for the respective groups so that the three lens groups independently moves during zooming. As a result, it is possible to improve the optical performance and to suppress the fluctuation of an F number accompanying the magnification.

Moreover, it is preferred that all the three lens groups of the third lens group G3 to the fifth lens group G5 are moved to the magnification side during zooming from the wide-angle end to the telephoto end. In this mode of embodiment thus constituted, it is possible to set the zooming ratio higher.

However, this means that the positions in the telephoto end state are set closer to the magnification side than the positions in the wide-angle end state, but does not exclude the once movement to the reduction side in an intermediate region.

Here, the second lens group G2 is fixed not only during zooming but also focusing so that it makes no contribution to that action. In case the aforementioned zoom lenses of the constitution of five groups and the three moving groups, as described in the aforementioned Patent Documents 1 and 2, it is conceivable that the second lens group G2 is optimized by coupling it to the third lens group G3 positioned in rear of the second lens group G2. In this case, in the wide-angle end state, the lenses contained in the second lens group G2 are moved in association with the third lens group C3 more to the reduction side than the zoom lens according to the invention.

Generally, the principal ray of an off-axis luminous flux is close to the optical axis if the principal ray is close to a diaphragm. As compared with a parallel plane plate, on the other hand, the inclination of the incident light on a spherical lens with respect to a plane normal to the optical axis becomes the larger as it leaves the optical axis the more. In the zoom lens according to the invention, the off-axis luminous flux is subjected to a stronger refraction in the second lens group G2 positioned closer to the magnification side than the case, in which the second lens group G2 and the third lens group G3 are cemented. As a result, the enlargement of the effective diameter of the rear portion of the focus group may be suppressed to provide an advantage on the aspect of the weight reduction of the projecting zoom lens.

The zoom lens composed of six groups and four moving groups, in which the second lens group G2 is movable independently of the remaining lens groups, as disclosed in Patent Documents 3 and 4, is advantageous in the aberration correction, because the degree of freedom for optical designs increases. However, this constitution invites an increase in the number of mechanical parts or the size of a cam cylinder, so that it is not desired from the view points of a lower cost and a lighter weight.

Moreover, the projecting zoom lens of this mode of embodiment is constituted to satisfy the following Conditional Expressions:

$$0.9 < |f1|/fw < 1.7 \quad (1)$$

$$55 < \nu d4 \quad (2)$$

and $$1.7 < Nav \quad (3)$$

where f1 denotes the focal length of the first lens group G1, fw denotes the focal length of the entire lens system in the wide-angle end state, νd4 denotes the Abbe number of glass material of which the positive lens contained in the fourth lens group G4 is made and Nav denotes mean value of the refractive indices at d-line of glass material of which the positive lens in the second lens group G2 and glass material of which the positive lens contained in the third lens group 63 is made.

Here are described the technical meanings of the aforementioned conditional expressions (1) to (3).

At first, the conditional expression (1) is defined to make the optical system compact while making the aberration correction satisfactory. Specifically, if the ratio is lower than the lower limit of the conditional expression (1), the power of the first lens group is excessively strong and thereby make it difficult to correct the aberrations produced by each lens group. If the ratio is higher than the upper limit, on the other hand, the power of the first lens group becomes so relatively low that the enlargement of the optical system is invited if the focal length of the whole system is kept within a predetermined range.

From this gist, it is more preferred that the following conditional expression (1') is satisfied in place of the Conditional Expression (1):

$$1.0 < |f1|/fw < 1.6 \quad (1')$$

Next, the conditional expression (2) is defined to reduce a longitudinal chromatic aberration thereby to suppress the occurrence of bleeding. If the Abbe number falls short of the lower limit of the conditional expression (2), more specifically, the longitudinal chromatic aberration increases to cause the bleeding.

Moreover, the conditional expression (3) is defined to correct the image curvature excellently. If the mean value falls short of the lower limit of the conditional expression (3), the Petzval sum increases to become a factor to deteriorate the focusing in a region apart from the optical axis.

Here, some (Examples 4 to 6) of the following Examples contain an aspheric lens, the aspheric shape of which is expressed by the following aspheric equation:

[A spheric Equation]

$$Z = \frac{Y^2/R}{1 + \sqrt{1 - K \times Y^2/R^2}} + \sum_{i=3}^{16} A_i Y^i$$

where Z denotes the length of a normal to a tangent plane (or a plane normal to the optical axis), from a point on an aspheric plane of a distance Y from the optical axis, Y denotes the distance from the optical axis, R denotes the radius of curvature of the aspheric plane near the optical axis, K denotes an eccentricity and A1 denotes an aspheric coefficient (i=3 to 16).

Figure 13:
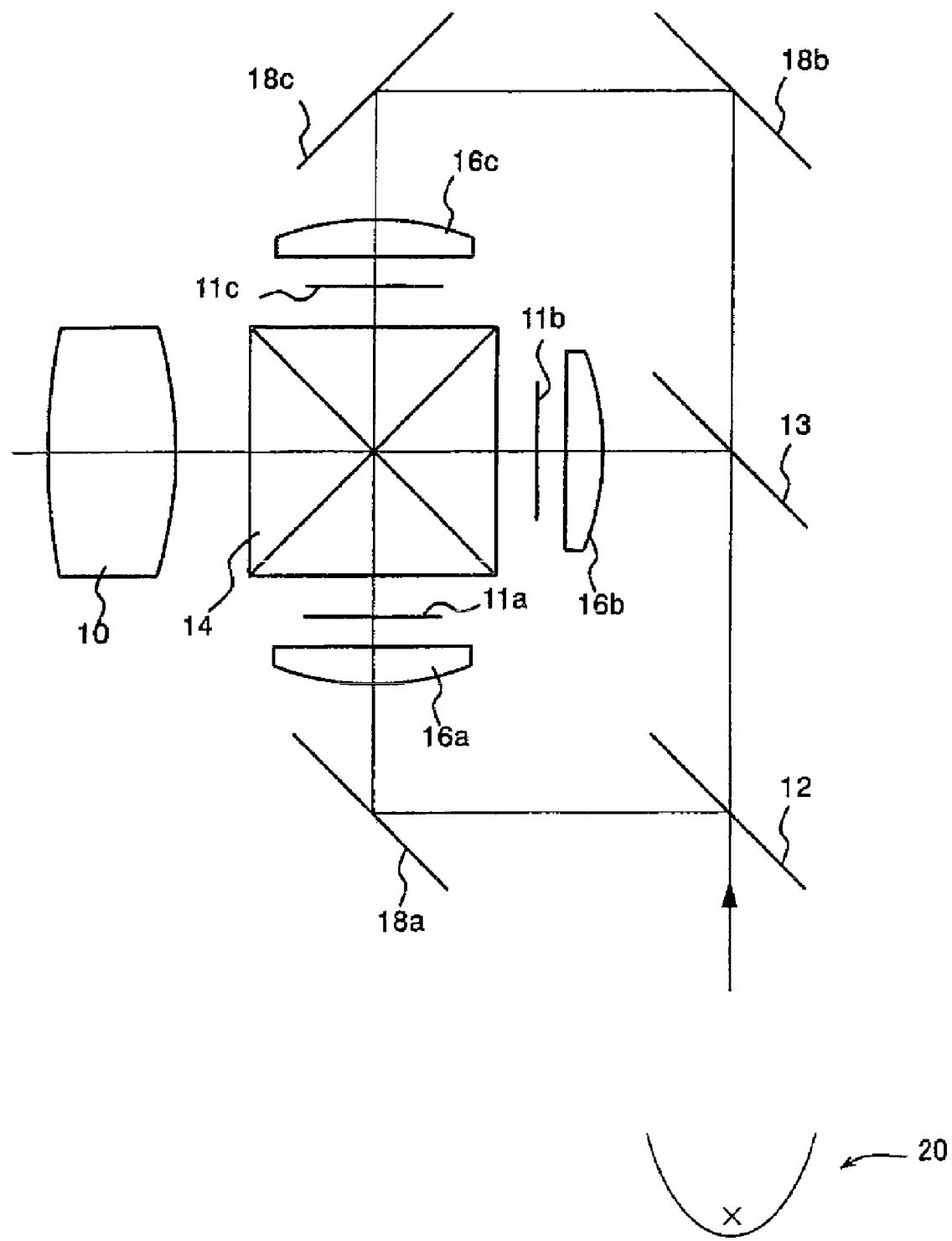
FIG. 13 shows a schematic constitution diagram of a projection type display device according to one mode of embodiment of the invention.

Next, one example of the projection type display device having the aforementioned projecting zoom lens mounted thereon is described with reference to FIG. 13. The projection type display device, as shown in FIG. 13, is provided with transmission type liquid crystal panels 11a to 11c as light valves, and employs a projecting zoom lens 10 according to the aforementioned mode of embodiment. Between a light source 20 and, a dichroic mirror 12, on the other hand, there is arranged an integrator (although not shown) such as a fly-eye. The white light from the light source 20 is incident through an illuminating optical unit on the liquid crystal panels 11a to 11c corresponding to three color optical fluxes (or a G-light, a B-light and an R-light), so that it is optically modulated, and is color-synthesized by a cross dichroic prism 14 so that it is projected on the not-shown screen by the projecting zoom lens 10. This device is provided with the dichroic mirrors 12 and 13 for the color separations, the dichroic prism 14 for the color synthesization, condenser lenses 16a to 16c, and total reflection mirrors 18a to 18c. The projection type display device of this mode of embodiment employs the projecting zoom lens according to this mode of embodiment so that it can be excellent in the wide-angle and in the projected image quality and can be bright and compact.

Here, the projecting zoom lens of the invention should not be limited in this using mode to the projecting zoom lens of the projection type display device employing the transmission type liquid crystal display panel, but could also be used as the projecting zoom lens of a device employing another optical modulation unit such as a reflection type liquid crystal display panel and a DMD.

The projecting zoom lens of the invention is further described in the following in connection with its specific embodiments.

Embodiment 1

The projecting zoom lens according to this Embodiment 1 is made to have the constitution of FIG. 1, as has been described hereinbefore. In this projecting zoom lens, specifically, the first lens group G1 includes in order from the magnification side, a first lens L1 made of a biconvex lens, a second lens L2 made of a negative meniscus lens having a convex face directed to the magnification side and a third lens L3 made of a biconcave lens The second lens group G2 includes a fourth lens L4 made of a positive meniscus lens having a convex face directed to the reduction side. The third lens group G3 includes a fifth lens L5 made of a biconvex lens. The fourth lens group G4 includes in order from the magnification side, a sixth lens L6 made of a biconcave lens and a seventh lens L7 made of a biconvex lens. The fifth lens group G5 includes in order from the magnification side, an eighth lens L8 made of a lens of a low power having a convex face directed to the magnification side, a cemented lens by cementing a ninth lens L9 made of a biconcave lens and a tenth lens L10 made of a biconvex lens, and an eleventh lens L11 made of a biconvex lens. The sixth lens group G6 includes a twelfth lens L12 made of a biconvex lens.

Here in this embodiment, the fifth lens group C5 is constituted to have a negative refractive power.

In this Embodiment 1, the radius of curvature R (as standardized for the focal length of 1 mm of the whole lens system, as in the following individual tables) of each lens surface; the center thickness of the respective lenses and the air distance D (as standardized like the aforementioned radius of curvature R, as in the following individual tables) between the respective lenses; and the refractive indices Nd and the Abbe numbers vd at the d-line of the respective lenses are tabulated in Table 1. Here, in this Table 1 and in the subsequent Tables 2 to 6, the numerals corresponding to the respective symbols R. D, Nd and vd are increased sequentially from the magnification side.

The mask is not shown in FIG. 1 but may be arranged, and may be exemplified by an aperture diaphragm.

TABLE 1 f = 14.68~17.62
Bfw = 26.81
Fno = 1.60~1.83
2ω = 57.4°~48.8°

| Surface | R | D | Nd | vd |
|---|---|---|---|---|
| 1 | 73.338 | 3.98 | 1.77250 | 49.6 |
| 2 | −518.142 | 0.20 | | |
| 3 | 43.119 | 1.50 | 1.71300 | 53.9 |
| 4 | 16.413 | 6.69 | | |
| 5 | −36.852 | 1.50 | 1.80610 | 33.3 |
| 6 | 33.188 | 9.30 | | |
| 7 | −68.820 | 2.90 | 1.72825 | 28.3 |
| 8 | −30.826 | 7.47~1.00 | | |
| 9 | 64.312 | 3.40 | 1.83400 | 37.2 |
| 10 | −85.737 | 22.44~21.49 | | |
| 11 | −207.056 | 1.10 | 1.84666 | 23.8 |
| 12 | 97.404 | 0.21 | | |
| 13 | 53.243 | 4.10 | 1.60311 | 60.6 |
| 14 | −30.505 | 0.98~5.80 | | |
| 15 | 20.287 | 1.20 | 1.60342 | 38.0 |
| 16 | 14.445 | 5.09 | | |
| 17 | −13.137 | 1.20 | 1.80610 | 33.3 |
| 18 | 51.222 | 5.97 | 1.60311 | 60.6 |
| 19 | −20.096 | 0.20 | | |
| 20 | 138.565 | 5.12 | 1.56384 | 60.8 |
| 21 | −27.400 | 0.92~3.51 | | |
| 22 | 51.568 | 4.61 | 1.60311 | 60.6 |
| 23 | −62.598 | 11.00 | | |
| 24 | ∞ | 24.20 | 1.51680 | 64.2 |
| 25 | ∞ | | | |

Moreover, Table 7 enumerates numerical values corresponding to the aforementioned respective conditional expressions in Embodiment 1.

FIG. 7 presents aberration diagrams showing several aberrations (i.e., spherical aberrations, astigmatisms, distortions, and lateral chromatic aberrations) of the projecting zoom lens of Embodiment 1. Here in FIG. 7 and subsequent FIG. 8 to FIG. 12: the respective spherical aberrations show the aberrations for lights having the wavelengths of 460.0 nm, 546.07 nm and 615.0 nm; the respective astigmatisms show the aberrations for a sagittal image surface and a tangential image surface; and the respective lateral chromatic aberrations show the aberrations of 460.0 nm and 615.0 nm for the light having the wavelength of 546.07 nm.

According to the projecting zoom lens of Embodiment 1, as apparent from FIG. 7, the angle of view 2ω is as wide as 57.4 degrees, and the respective aberrations are satisfactorily corrected.

As tabulated in Table 7, moreover, the conditional expressions (1), (1'), (2) and (3) are satisfied according to the projecting zoom lens of Embodiment 1.

Embodiment 2

Figure 2:
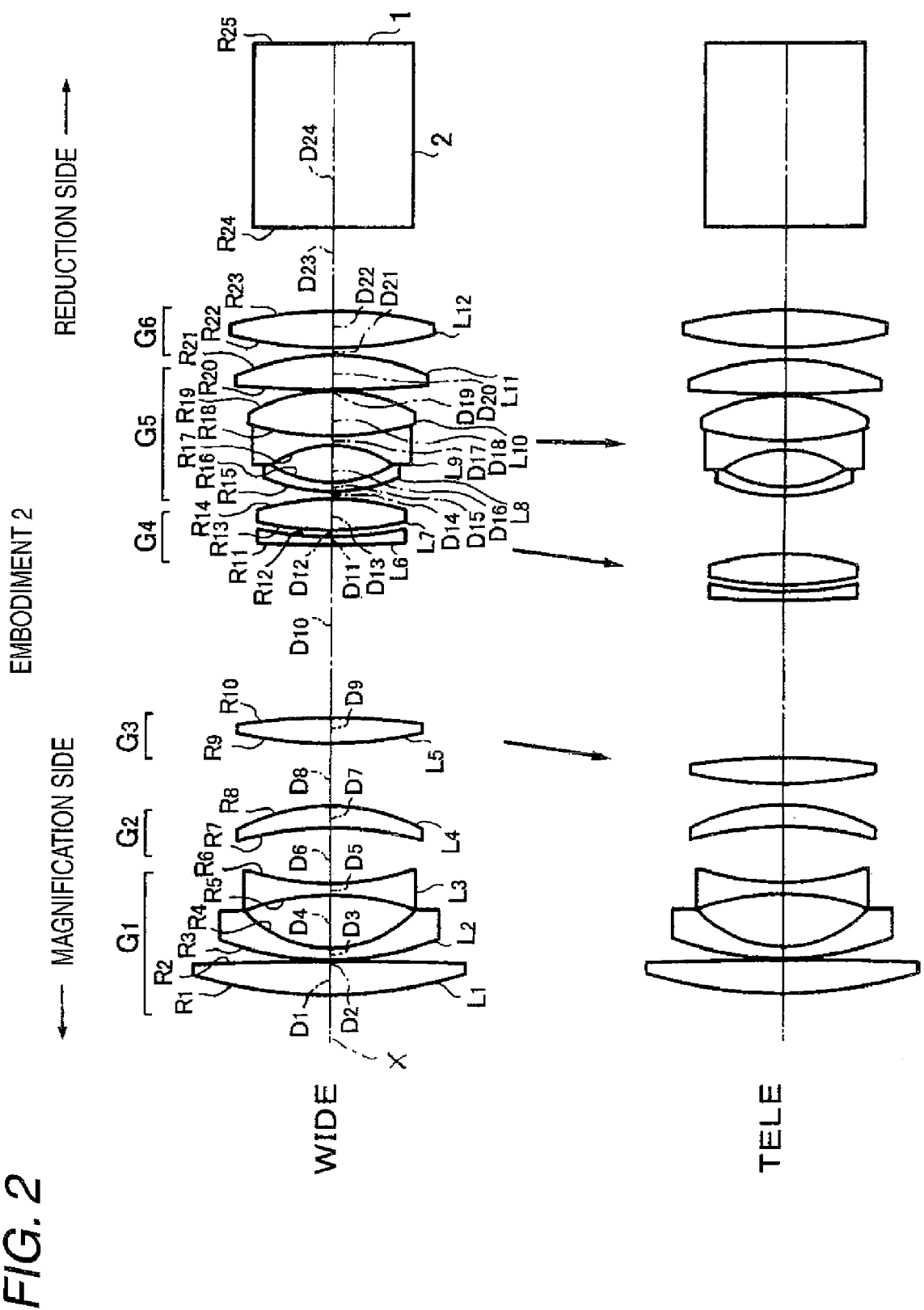
FIG. 2 shows a schematic view showing a constitution of a projecting zoom lens according to Embodiment 2 of the invention.

The schematic constitution of the projecting zoom lens according to Embodiment 2 is shown in FIG. 2. The projecting zoom lens according to Embodiment 2 is given a constitution substantially similar to that of Embodiment 1, and the fifth lens group G5 is also constituted to have a negative refractive power.

In this Embodiment 2, the radius of curvature R of each lens surface, the center thickness of the respective lenses and the air distance D between the respective lenses, and the refractive indices Nd and the Abbe numbers vd at the d-line of the individual lenses are tabulated in Table 2.

TABLE 2 f = 14.67~17.61
Bfw = 26.82
Fno = 1.60~1.83
2ω = 57.4°~48.8°

| Surface | R | D | Nd | vd |
|---|---|---|---|---|
| 1 | 62.205 | 4.37 | 1.71300 | 53.9 |
| 2 | −536.909 | 0.20 | | |
| 3 | 40.484 | 1.50 | 1.71300 | 53.9 |
| 4 | 15.541 | 6.93 | | |
| 5 | −33.760 | 1.50 | 1.80610 | 33.3 |
| 6 | 33.760 | 7.32 | | |
| 7 | −47.203 | 2.90 | 1.67270 | 32.2 |
| 8 | −25.874 | 8.13~2.67 | | |
| 9 | 54.586 | 3.50 | 1.80610 | 33.3 |
| 10 | −82.783 | 22.71~20.83 | | |
| 11 | 186.153 | 1.10 | 1.84666 | 23.8 |
| 12 | 45.957 | 0.90 | | |
| 13 | 44.322 | 4.10 | 1.60311 | 60.6 |
| 14 | −33.392 | 0.98~7.62 | | |
| 15 | 23.364 | 1.20 | 1.51742 | 52.2 |
| 16 | 15.553 | 4.89 | | |
| 17 | −14.025 | 1.20 | 1.80610 | 33.3 |
| 18 | 38.557 | 5.95 | 1.65160 | 58.5 |
| 19 | −22.481 | 0.20 | | |
| 20 | 150.568 | 4.57 | 1.60311 | 60.6 |
| 21 | −31.843 | 0.97~1.68 | | |
| 22 | 53.254 | 4.86 | 1.60311 | 60.6 |
| 23 | −53.254 | 11.00 | | |
| 24 | ∞ | 24.20 | 1.51680 | 64.2 |
| 25 | ∞ | | | |

Moreover, Table 7 enumerates numerical values corresponding to the aforementioned individual conditional expressions in Embodiment 2.

FIG. 8 presents aberration diagrams showing several aberrations (i.e., spherical aberrations, astigmatisms, distortions, and lateral chromatic aberrations) of the projecting zoom lens of Embodiment 2.

According to the projecting zoom lens of Embodiment 2, as apparent from FIG. 8, the angle of view 2ω is as wide as 57.4 degrees, and the respective aberrations are satisfactorily corrected.

As tabulated in Table 7, moreover, the conditional expressions (1), (1'), (2) and (3) are satisfied according to the projecting zoom lens of Embodiment 2.

Embodiment 3

Figure 3:
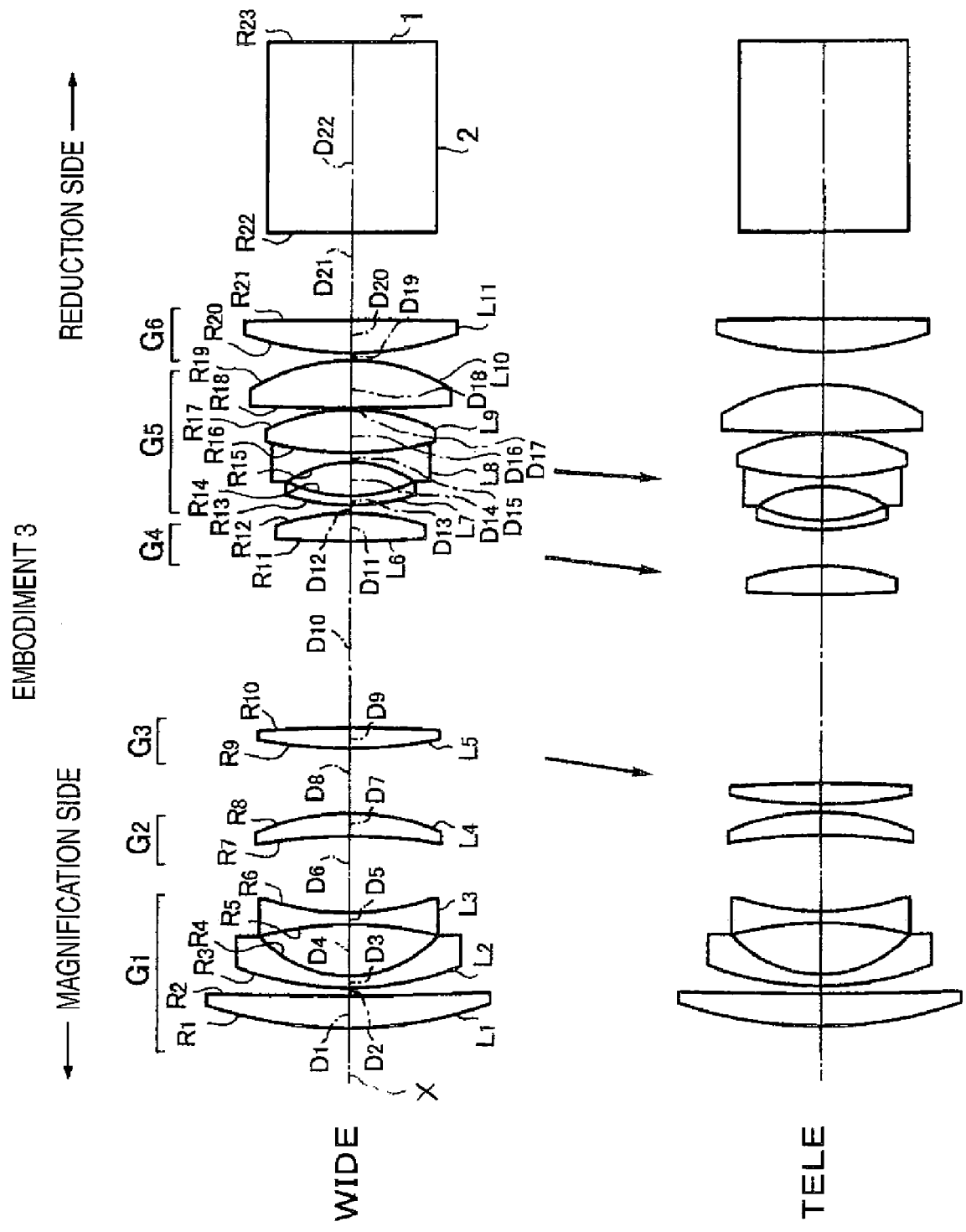
FIG. 3 shows a schematic view showing a constitution of a projecting zoom lens according to Embodiment 3 of the invention.

The schematic constitution of the projecting zoom lens according to Embodiment 3 is shown in FIG. 3. The projecting zoom lens according to Embodiment 3 is given a constitution substantially similar to that of Embodiment 1, and the fifth lens group G5 is also constituted to have a negative refractive power. From Embodiment 1, however, Embodiment 3 is different in that the fourth lens group G4 consists of the sixth lens L6 made of a positive lens.

Here, the projecting zoom lens of Embodiment 3 is different in the number of lenses from Embodiment 1, so that the given lens numbers are sequentially shifted according to the differences.

In this Embodiment 3, the radius of curvature R of each lens face, the center thickness of the respective lenses and the air distance D between the respective lenses, and the refractive indices Nd and the Abbe numbers vd at the d-line of the respective lenses are tabulated in Table 3.

TABLE 3 f = 14.70~17.64
Bfw = 26.81
Fno = 1.60~1.80
2ω = 57.2°~48.8°

| Surface | R | D | Nd | vd |
|---|---|---|---|---|
| 1 | 55.427 | 4.09 | 1.83114 | 44.9 |
| 2 | 495.016 | 1.00 | | |
| 3 | 39.306 | 1.50 | 1.72502 | 55.2 |
| 4 | 15.360 | 6.43 | | |
| 5 | −45.783 | 1.50 | 1.84510 | 37.2 |
| 6 | 32.803 | 9.65 | | |
| 7 | −71.472 | 2.90 | 1.69367 | 30.5 |
| 8 | −29.917 | 8.32~0.99 | | |
| 9 | 58.691 | 2.70 | 1.84508 | 30.5 |
| 10 | −161.939 | 23.62~24.07 | | |
| 11 | 140.944 | 3.61 | 1.55788 | 62.8 |
| 12 | −29.748 | 1.00~4.63 | | |
| 13 | 26.535 | 1.20 | 1.84526 | 22.7 |
| 14 | 18.771 | 4.34 | | |
| 15 | −14.378 | 1.20 | 1.83623 | 23.2 |
| 16 | 40.864 | 5.48 | 1.62823 | 60.1 |
| 17 | −24.271 | 0.20 | | |
| 18 | 251.937 | 6.09 | 1.54097 | 63.4 |
| 19 | −23.896 | 0.94~4.18 | | |
| 20 | 39.378 | 4.16 | 1.84513 | 22.7 |
| 21 | −764.975 | 11.00 | | |
| 22 | ∞ | 24.20 | 1.51680 | 64.2 |
| 23 | ∞ | | | |

Moreover, Table 7 enumerates numerical values corresponding to the aforementioned individual conditional expressions in Embodiment 3.

FIG. 9 presents aberration diagrams showing several aberrations (i.e., spherical aberrations, astigmatisms, distortions, and lateral chromatic aberrations) of the projecting zoom lens of Embodiment 3.

According to the projecting zoom lens of Embodiment 3, as apparent from FIG. 9, the angle of view 2ω is as wide as 57.2 degrees, and the respective aberrations are satisfactorily corrected.

As tabulated in Table 7, moreover, the conditional expressions (1), (1'), (2) and (3) are satisfied according to the projecting zoom lens of Embodiment 3.

Embodiment 4

Figure 4:
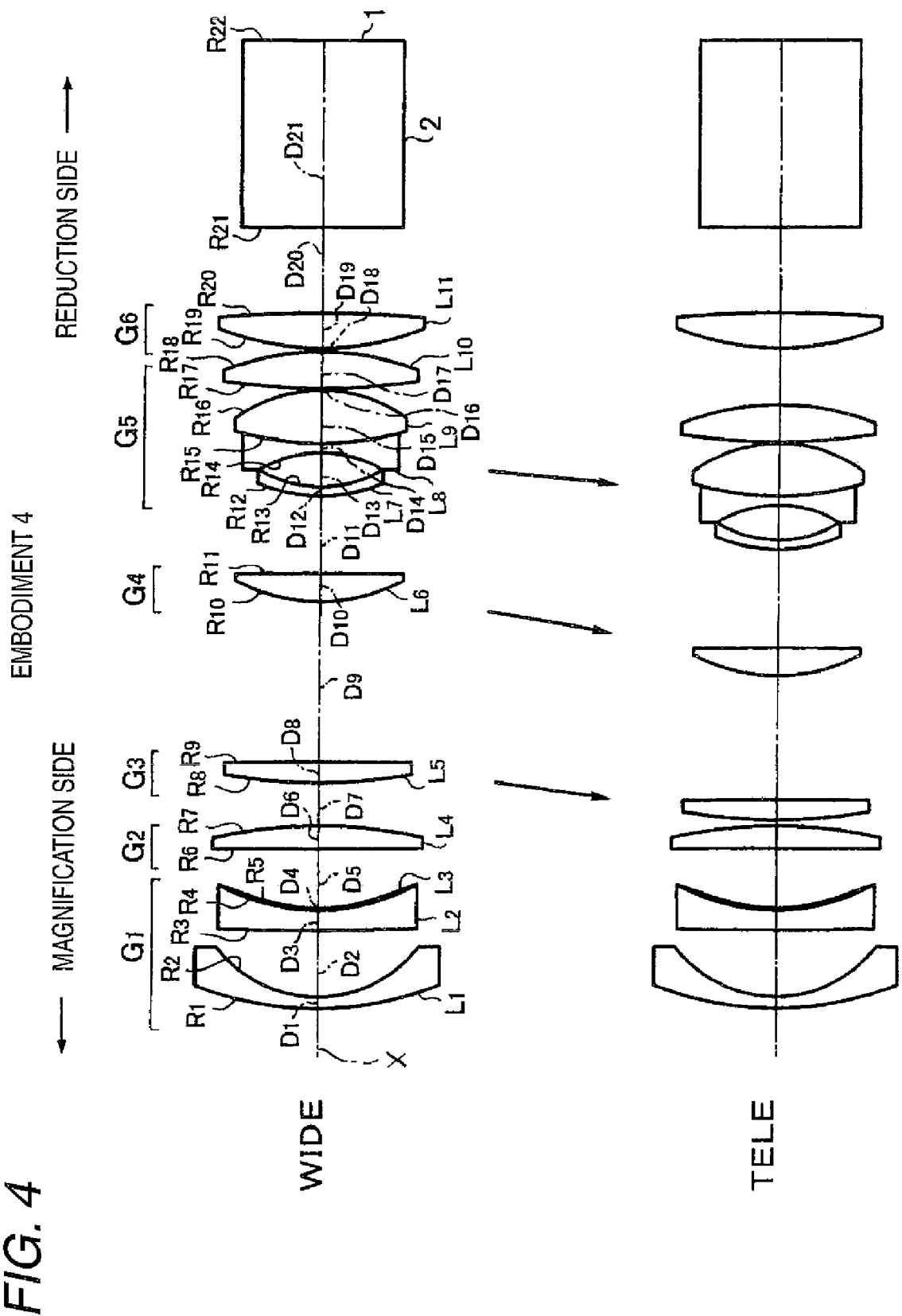
FIG. 4 shows a schematic view showing a constitution of a projecting zoom lens according to Embodiment 4 of the invention.

The schematic constitution of the projecting zoom lens according to Embodiment 4 is shown in FIG. 4. The projecting zoom lens according to Embodiment 4 is given a constitution substantially similar to that of Embodiment 1, but is different mainly in that the third lens L3 made of a thin resin lens added for forming an aspheric surface to the reduction side of the second lens L2 in the first lens group G1, in that the fourth lens group G4 consists of the sixth lens L6 made of a positive lens, and in that the fifth lens group G5 is constituted to have a positive refractive power.

Here, the projecting zoom lens of Embodiment 4 is different in the number of lenses from Embodiment 1, so that the given lens numbers are sequentially shifted according to the differences.

In this Embodiment 4, the radius of curvature R of each lens face, the center thickness of the respective lenses and the air distance D between the respective lenses, and the refractive indices Nd and the Abbe numbers vd at the d-line of the respective lenses are tabulated in Table 4.

Moreover, the fifth surface (or the surface of the reduction side of the third lens L3) is made a spheric, and the respective values K, A3, A4, A5, A6, A7, A8, A9, A10, A11, A12, A13, A14, A15 and A16 are tabulated for those individual aspheric planes in the lower column of Table 4.

TABLE 4 f = 14.63~17.56 Bfw = 26.82
Fno = 1.60~1.77 2ω = 57.4°~49.2°

| Surface | R | D | Nd | vd |
|---|---|---|---|---|
| 1 | 43.880 | 1.50 | 1.67401 | 57.8 |
| 2 | 16.980 | 8.50 | | |
| 3 | 417.069 | 2.60 | 1.60406 | 61.0 |
| 4 | 27.473 | 0.20 | 1.49023 | 57.5 |
| 5* | 21.412 | 7.77 | | |
| 6 | −5853.891 | 2.90 | 1.72147 | 28.9 |
| 7 | −64.548 | 5.63~0.79 | | |
| 8 | 72.813 | 2.70 | 1.84002 | 44.0 |
| 9 | −556.979 | 20.82~16.02 | | |
| 10 | 23.553 | 3.61 | 1.48749 | 70.4 |
| 11 | −805.621 | 10.02~12.73 | | |
| 12 | 21.226 | 1.20 | 1.82402 | 23.8 |
| 13 | 15.717 | 4.49 | | |
| 14 | −15.801 | 1.20 | 1.80610 | 33.3 |
| 15 | 40.372 | 6.89 | 1.53083 | 63.8 |
| 16 | −19.200 | 0.20 | | |
| 17 | 85.323 | 4.77 | 1.60557 | 60.9 |
| 18 | −35.616 | 0.49~7.41 | | |
| 19 | 37.003 | 4.51 | 1.64021 | 59.5 |
| 20 | −167.847 | 11.00 | | |
| 21 | ∞ | 24.20 | 1.51680 | 64.2 |
| 22 | ∞ | | | |

| Aspheric coefficient | Surface number 5 |
|---|---|
| K | 0.0000000 |
| $A_3$ | $-6.8309722 \times 10^{-6}$ |
| $A_4$ | $-3.4057177 \times 10^{-5}$ |
| $A_5$ | $-7.7226117 \times 10^{-7}$ |
| $A_6$ | $1.6040161 \times 10^{-8}$ |
| $A_7$ | $1.2138903 \times 10^{-9}$ |
| $A_8$ | $-2.1010083 \times 10^{-10}$ |
| $A_9$ | $-4.9616795 \times 10^{-12}$ |
| $A_{10}$ | $1.0253003 \times 10^{-12}$ |
| $A_{11}$ | $-3.5262828 \times 10^{-14}$ |
| $A_{12}$ | $-8.6575060 \times 10^{-15}$ |
| $A_{13}$ | $5.4259450 \times 10^{-16}$ |
| $A_{14}$ | $-8.9496136 \times 10^{-19}$ |
| $A_{15}$ | $4.7825347 \times 10^{-19}$ |
| $A_{16}$ | $-2.3230657 \times 10^{-20}$ |

*Aspheric surface

Moreover, Table 7 enumerates numerical values corresponding to the aforementioned respective conditional expressions in Embodiment 4.

FIG. 10 presents aberration diagrams showing several aberrations (i.e., spherical aberrations, astigmatisms, distortions, and lateral chromatic aberrations) of the projecting zoom lens of Embodiment 4.

According to the projecting zoom lens of Embodiment 4, as apparent from FIG. 10, the angle of view 2ω is as wide as 57.4 degrees, and the individual aberrations are satisfactorily corrected.

As tabulated in Table 5, moreover, the conditional expressions (1), (1'), (2) and (3) are satisfied according to the projecting zoom lens of Embodiment 4.

Embodiment 5

Figure 5:
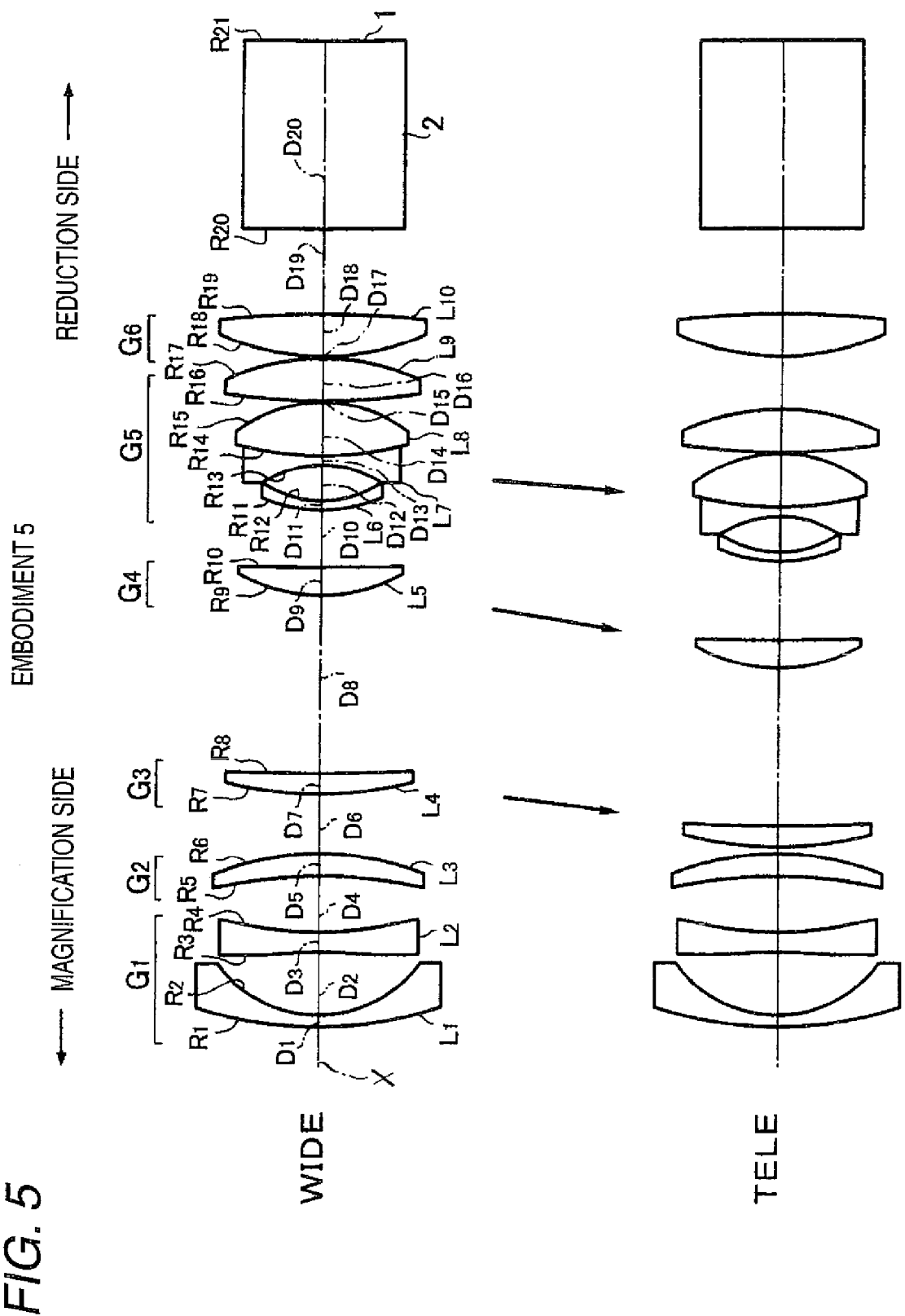
FIG. 5 shows a schematic view showing a constitution of a projecting zoom lens according to Embodiment 5 of the invention.

The schematic constitution of the projecting zoom lens according to Embodiment 5 is shown in FIG. 5. The projecting zoom lens according to Embodiment 5 is given a constitution substantially similar to that of Embodiment 1 such that the fifth lens group G5 also has a negative refractive power, but is different mainly in that the first lens group G1 includes the first lens L1 made of a negative meniscus lens having a convex face directed to the magnification side and the second lens L2 made of a biconcave aspheric lens in the paraxial region, and in that the fourth lens group G4 consists of the fifth lens L5 made of a positive lens.

Here, the projecting zoom lens of Embodiment 5 is different in the lens number from Embodiment 1, so that the given lens numbers are sequentially shifted according to the differences.

In this Embodiment 5, the radius of curvature R of each lens face, the center thickness of the respective lenses and the air distance D between the respective lenses, and the refractive indices Nd and the Abbe numbers vd at the d-line of the individual lenses are tabulated in Table 5.

Moreover, the third surface (or the surface of the magnification side of the second lens L2) and the fourth surface (or the surface of the reduction side of the second lens L2) are made a spheric, and the respective values K, A3, A4, A5, A6, A7, A8, A9, A10, A11, A12, A13, A14, A15 and A16 are tabulated for those individual aspheric surfaces in the lower column of Table 5.

TABLE 5 f = 14.68~17.62 Bfw = 26.82
Fno = 1.60~1.78 2ω = 57.40°~49.00°

| Surface | R | D | Nd | vd |
|---|---|---|---|---|
| 1 | 51.817 | 1.50 | 1.70791 | 56.1 |
| 2 | 16.329 | 8.10 | | |
| 3* | −61.899 | 2.60 | 1.51007 | 56.2 |
| 4* | 59.468 | 7.21 | | |
| 5 | −66.781 | 2.90 | 1.76149 | 26.9 |
| 6 | −37.717 | 7.66~0.92 | | |
| 7 | 47.801 | 2.70 | 1.84002 | 43.9 |
| 8 | 240.242 | 23.06~20.40 | | |
| 9 | 21.829 | 3.61 | 1.48749 | 70.4 |
| 10 | 603.732 | 7.41~10.15 | | |
| 11 | 20.078 | 1.20 | 1.84001 | 23.0 |
| 12 | 14.172 | 4.60 | | |
| 13 | −14.482 | 1.20 | 1.80610 | 33.3 |
| 14 | 43.310 | 6.92 | 1.54212 | 57.1 |
| 15 | −18.528 | 0.20 | | |
| 16 | 89.445 | 5.50 | 1.57305 | 62.2 |
| 17 | −30.806 | 0.22~6.89 | | |
| 18 | 33.312 | 5.50 | 1.54051 | 63.4 |
| 19 | −121.537 | 11.00 | | |
| 20 | ∞ | 24.20 | 1.51633 | 64.1 |
| 21 | ∞ | | | |

| Aspheric coefficient | Surface number | |
|---|---|---|
| | 3 | 4 |
| K | 0.0000000 | 0.0000000 |
| $A_3$ | $-9.1603252 \times 10^{-5}$ | $-7.0122935 \times 10^{-5}$ |
| $A_4$ | $1.3574741 \times 10^{-4}$ | $9.6423971 \times 10^{-5}$ |
| $A_5$ | $-7.3945205 \times 10^{-6}$ | $-2.7560443 \times 10^{-6}$ |
| $A_6$ | $-1.1734174 \times 10^{-7}$ | $-7.3223087 \times 10^{-7}$ |
| $A_7$ | $-6.0201424 \times 10^{-9}$ | $3.3068961 \times 10^{-8}$ |
| $A_8$ | $3.0849697 \times 10^{-9}$ | $8.2195696 \times 10^{-10}$ |
| $A_9$ | $-4.1335814 \times 10^{-11}$ | $1.1978482 \times 10^{-10}$ |
| $A_{10}$ | $-5.7441305 \times 10^{-12}$ | $-6.6869747 \times 10^{-12}$ |
| $A_{11}$ | $-6.1862277 \times 10^{-13}$ | $-1.2047571 \times 10^{-12}$ |
| $A_{12}$ | $-2.6151266 \times 10^{-14}$ | $-2.9312294 \times 10^{-14}$ |
| $A_{13}$ | $4.4380842 \times 10^{-15}$ | $6.2412484 \times 10^{-16}$ |
| $A_{14}$ | $1.6124918 \times 10^{-16}$ | $5.2509785 \times 10^{-16}$ |
| $A_{15}$ | $-2.1068206 \times 10^{-18}$ | $3.7675990 \times 10^{-17}$ |
| $A_{16}$ | $-4.0990179 \times 10^{-19}$ | $-3.2776715 \times 10^{-18}$ |

*Aspheric surface

Moreover, Table 7 enumerates numerical values corresponding to the aforementioned individual conditional expressions in Embodiment 5.

FIG. 11 presents aberration diagrams showing several aberrations (i.e., spherical aberrations, astigmatisms, distortions, and lateral chromatic aberrations) of the projecting zoom lens of Embodiment 5.

According to the projecting zoom lens of Embodiment 5, as apparent from FIG. 11, the angle of view $2\omega$ is as wide as 57.4 degrees, and the respective aberrations are satisfactorily corrected.

As tabulated in Table 5, moreover, the conditional expressions (1), (1'), (2) and (3) are satisfied according to the projecting zoom lens of Embodiment 5.

Embodiment 6

Figure 6:
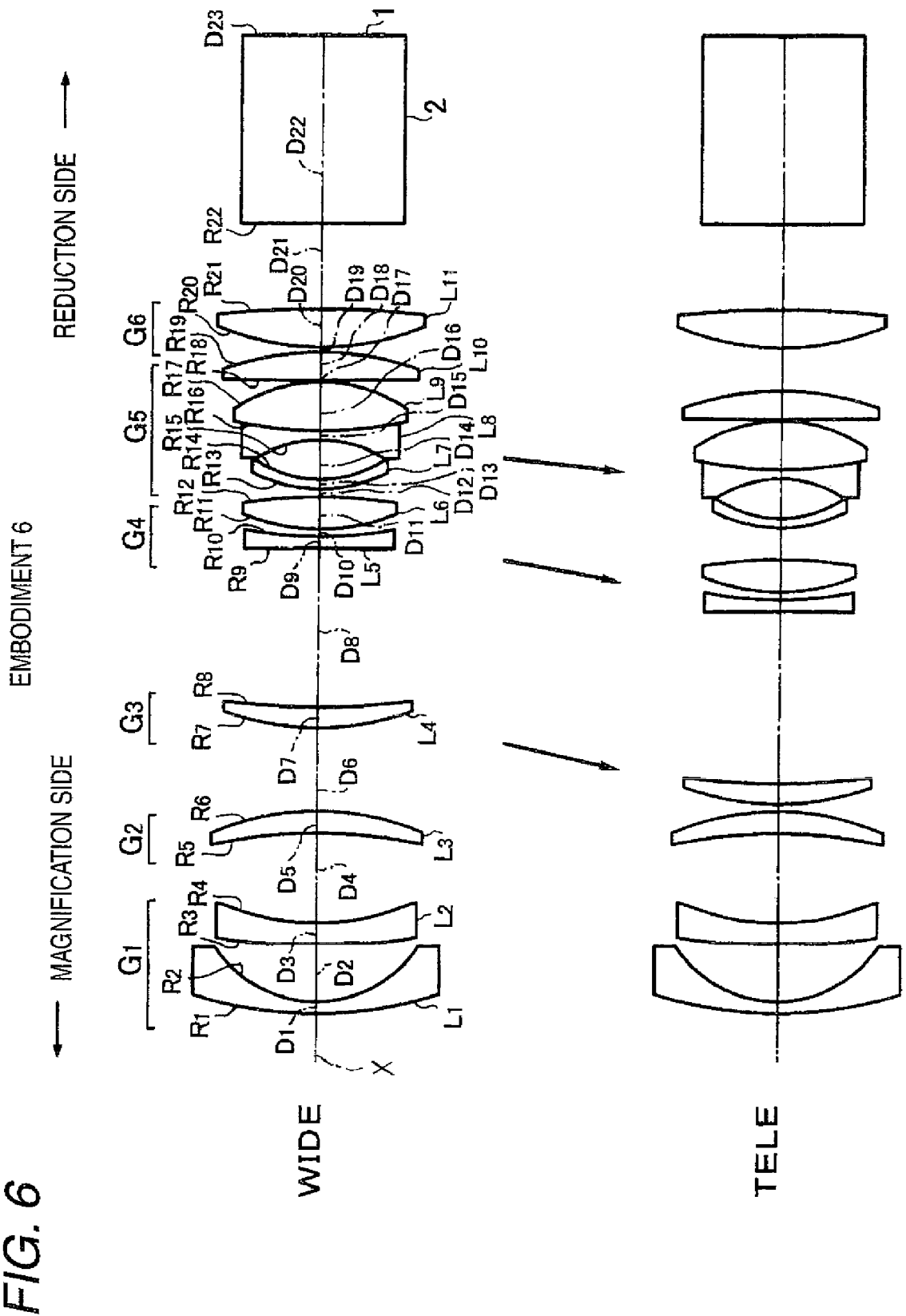
FIG. 6 shows a schematic view showing a constitution of a projecting zoom lens according to Embodiment 6 of the invention.

The schematic constitution of the projecting zoom lens according to Embodiment 6 is shown in FIG. 6. The projecting zoom lens according to Embodiment 6 is given a constitution substantially similar to that of Embodiment 1, but is different mainly in that the first lens group G1 includes the first lens L1 made of a negative meniscus lens having a convex face directed to the magnification side and the second lens L2 made of a biconcave aspheric lens in the paraxial region, in that the positive lens L4 included in the third lens group G3 is made of a positive meniscus lens having a convex surface directed to the magnification side, and in that the fifth lens group G5 is constituted to have a positive refractive power.

Here, the projecting zoom lens of Embodiment 6 is different in the number of lenses from Embodiment 1, so that the given lens numbers are sequentially shifted according to the differences.

In this Embodiment 6, the radius of curvature R of each lens face, the center thickness of the respective lenses and the air distance D between the respective lenses, and the refractive indices Nd and the Abbe numbers d at the d-line of the individual lenses are tabulated in Table 6.

Moreover, the third surface (or the surface of the magnification side of the second lens L2) and the fourth surface (or the surface of the reduction side of the second Lens L2) are made aspheric, and the respective values K, A3, A4, A5, A6, A7, A8, A9, A10, A11, A12, A13, A14, A15 and A16 are tabulated for those respective aspheric surfaces in the lower column of Table 5.

TABLE 6 f = 14.59~17.51 Bfw = 26.83
Fno = 1.60~1.76 $2\omega$ = 57.4°~49.2°

| Surface | R | D | Nd | vd |
|---|---|---|---|---|
| 1 | 53.264 | 1.50 | 1.58001 | 61.9 |
| 2 | 15.762 | 7.55 | | |
| 3* | −218.343 | 2.60 | 1.51007 | 56.2 |
| 4* | 37.246 | 11.49 | | |
| 5 | −66.193 | 2.90 | 1.77009 | 26.5 |
| 6 | −34.533 | 10.77~0.91 | | |
| 7 | 35.366 | 2.70 | 1.84003 | 44.0 |
| 8 | 94.986 | 20.44~22.29 | | |
| 9 | −700.671 | 1.50 | 1.84001 | 23.0 |
| 10 | 51.341 | 1.00 | | |
| 11 | 26.606 | 4.20 | 1.61429 | 60.6 |
| 12 | −59.561 | 1.00~4.07 | | |
| 13 | 19.742 | 1.20 | 1.70546 | 29.7 |
| 14 | 15.153 | 5.11 | | |
| 15 | −15.888 | 1.20 | 1.84000 | 39.1 |
| 16 | 52.080 | 6.31 | 1.60035 | 61.1 |
| 17 | −19.950 | 0.20 | | |
| 18 | 729.845 | 3.70 | 1.63471 | 59.8 |
| 19 | −37.784 | 0.62~5.57 | | |
| 20 | 34.733 | 4.95 | 1.63560 | 59.7 |
| 21 | −122.317 | 11.00 | | |
| 22 | ∞ | 24.20 | 1.51633 | 64.1 |
| 23 | ∞ | | | |

| Aspheric coefficient | Surface number | |
|---|---|---|
| | 3 | 4 |
| K | 0.0000000 | 0.0000000 |
| $A_3$ | $-1.4215788 \times 10^{-4}$ | $-9.2664556 \times 10^{-5}$ |
| $A_4$ | $1.3709343 \times 10^{-4}$ | $1.0270058 \times 10^{-4}$ |
| $A_5$ | $-7.1730296 \times 10^{-6}$ | $-2.4960900 \times 10^{-6}$ |
| $A_6$ | $-1.1316482 \times 10^{-7}$ | $-7.2560319 \times 10^{-7}$ |
| $A_7$ | $-6.7032464 \times 10^{-9}$ | $3.2157763 \times 10^{-8}$ |
| $A_8$ | $3.0874870 \times 10^{-9}$ | $7.3285114 \times 10^{-10}$ |
| $A_9$ | $-4.2904924 \times 10^{-11}$ | $1.1414355 \times 10^{-10}$ |
| $A_{10}$ | $-5.0778353 \times 10^{-12}$ | $-6.8197710 \times 10^{-12}$ |
| $A_{11}$ | $-5.8315687 \times 10^{-13}$ | $-1.1239363 \times 10^{-12}$ |
| $A_{12}$ | $-2.2272476 \times 10^{-14}$ | $-2.5050966 \times 10^{-14}$ |
| $A_{13}$ | $4.7051752 \times 10^{-15}$ | $9.8691079 \times 10^{-16}$ |
| $A_{14}$ | $1.7092568 \times 10^{-16}$ | $5.5647660 \times 10^{-16}$ |
| $A_{15}$ | $-4.2991082 \times 10^{-18}$ | $3.4683548 \times 10^{-17}$ |
| $A_{16}$ | $-7.6424454 \times 10^{-19}$ | $-3.7545501 \times 10^{-18}$ |

*Aspheric surface

Moreover, Table 7 enumerates numerical values corresponding to the aforementioned individual conditional expressions in Embodiment 6.

FIG. 12 presents aberration diagrams showing several aberrations (i.e., spherical aberrations, astigmatisms, distortions, and lateral chromatic aberrations) of the projecting zoom lens of Embodiment 6.

According to the projecting zoom lens of Embodiment 6, as apparent from FIG. 12, the angle of view $2\omega$ is as wide as 57.4 degrees, and the respective aberrations are satisfactorily corrected.

As tabulated in Table 7, moreover, the conditional expressions (1), (1'), (2) and (3) are satisfied according to the projecting zoom lens of Embodiment 6.

TABLE 7

| | Embodiment 1 | Embodiment 2 | Embodiment 3 | Embodiment 4 | Embodiment 5 | Embodiment 6 |
|---|---|---|---|---|---|---|
| \|f1\|/fw | 1.096730 | 1.065440 | 1.166667 | 1.352016 | 1.502725 | 1.235778 |
| vd4 | 60.6 | 60.6 | 62.8 | 70.4 | 70.4 | 60.6 |
| Nav | 1.781125 | 1.739400 | 1.769375 | 1.780745 | 1.800755 | 1.805060 | where fw denotes the focal length of the whole lens system at the wide angle end, f1 denotes the focal length of the first lens group, vd4 denotes the Abbe number of glass material forming the positive lens contained in the fourth lens group G4 and Nav denotes mean value of the refractive indices at the d-line of the glass material of which the positive lens in the second lens group and the glass material of which the positive lens in the third lens groups.

What is claimed is:

1. A projecting zoom lens comprising, in order from a magnification side:
    a first lens group having a negative refractive power;
    a second lens group having a positive refractive power;
    a third lens group having a positive refractive power;
    a fourth lens group having a positive refractive power;
    a fifth lens group having a positive or negative refractive power; and
    a sixth lens group having a positive refractive power;
    wherein the third to fifth lens groups are moved along an optical axis toward the magnification side during zooming from a wide-angle end state to a telephoto end state and
    the following Conditional Expressions (1) to (2) are satisfied:

$$0.9 < |f1|/fw < 1.7 \tag{1}$$

$$55 < vd4 \tag{2}$$

where f1 denotes a focal length of the first lens group,
fw denotes a focal length of the projecting zoom lens at the wide angle end state, and
vd4 denotes an Abbe number of glass material of which a positive lens contained in the fourth lens group is made.

2. A projecting zoom lens according to claim 1,
    wherein the first lens group and the sixth lens group are fixed during zooming.

3. A projecting zoom lens according to claim if
    wherein the first lens group is moved along the optical axis during focusing.

4. A projecting zoom lens according to claim 1,
    wherein the second lens group includes a positive lens having a convex face directed toward a reduction side, and
    the third lens group includes a positive lens having a convex face directed toward a magnification side.

5. A projecting zoom lens according to claim 1,
    wherein the following Conditional Expression (3) is satisfied:

$$1.7 < Nav \tag{3}$$

where Nav denotes mean value of refractive indices at d-line of (i) glass material of which a positive lens contained in the second lens group is made and (ii) glass material of which a positive lens contained of third lens group is made.

6. A projection type display device comprising:
    a light source;
    a light valve;
    an illuminating optical unit that guides the luminous flux from the light source to the light valve; and
    a projecting zoom lens of claims 1,
    wherein the light valve modulates the luminous flux from the light source, and
    the projection type display device projects the modulated luminous flux on a screen.

* * * * *